(12) United States Patent
Doglio et al.

(10) Patent No.: US 12,308,008 B2
(45) Date of Patent: May 20, 2025

(54) SYSTEM AND METHOD FOR REDUCING ACOUSTIC ENERGY NEAR HDD SYSTEMS

(71) Applicant: Dell Products L.P., Round Rock, TX (US)

(72) Inventors: Jean Marie Doglio, Round Rock, TX (US); Evangelos Konstantinos Koutsavdis, Leander, TX (US); Chris E. Peterson, Austin, TX (US); Paul Allen Waters, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 339 days.

(21) Appl. No.: 17/648,870

(22) Filed: Jan. 25, 2022

(65) Prior Publication Data

US 2023/0237984 A1    Jul. 27, 2023

(51) Int. Cl.
| | | |
|---|---|---|
| *G10K 11/168* | (2006.01) | |
| *B32B 5/18* | (2006.01) | |
| *B32B 27/06* | (2006.01) | |
| *B32B 27/36* | (2006.01) | |
| *G06F 1/18* | (2006.01) | |
| *G11B 33/08* | (2006.01) | |
| *G11B 33/14* | (2006.01) | |

(52) U.S. Cl.
CPC ............. *G10K 11/168* (2013.01); *B32B 5/18* (2013.01); *B32B 27/065* (2013.01); *B32B 27/36* (2013.01); *G06F 1/187* (2013.01); *G11B 33/08* (2013.01); *G11B 33/14* (2013.01); *B32B 2307/102* (2013.01)

(58) Field of Classification Search
CPC .... G11B 33/08; G10K 11/162; G10K 11/168; B32B 2307/102
See application file for complete search history.

(56) References Cited

U.S. PATENT DOCUMENTS

| | | | | |
|---|---|---|---|---|
| 5,680,295 A | * | 10/1997 | Le | G06F 1/20 361/679.48 |
| 6,005,768 A | * | 12/1999 | Jo | G11B 33/08 360/99.18 |
| 7,167,360 B2 | * | 1/2007 | Inoue | G06F 1/184 174/544 |
| 7,405,928 B2 | * | 7/2008 | Robertson | G11B 33/08 |

(Continued)

FOREIGN PATENT DOCUMENTS

| | | | |
|---|---|---|---|
| JP | 2006050932 | * | 2/2006 |
| JP | 2006050932 A | * | 2/2006 |

*Primary Examiner* — Forrest M Phillips
*Assistant Examiner* — Joseph James Peter Illicete
(74) *Attorney, Agent, or Firm* — McDermott Will & Emery LLP

(57) ABSTRACT

A system for protecting a hard disc drive (HDD) from acoustic energy in a chassis comprises a set of foam strips formed from acoustically absorptive material. Each foam strip has a thickness such that, when the HDD is installed in a chassis, the acoustically absorptive material is in a substantially uncompressed state. Foam strips are separated by an airflow path width, wherein two foam strips, a first surface of an HDD and a second surface form an airflow path. The second surface may be a surface of an adjacent HDD or a wall of the chassis. Each foam strip has a width and length configured for absorbing acoustic energy that would otherwise propagate through the airflow path.

17 Claims, 8 Drawing Sheets

(56) References Cited

U.S. PATENT DOCUMENTS

| | | | |
|---|---|---|---|
| 7,518,859 B2* | 4/2009 | Kobayashi | G11B 33/08 |
| | | | 361/536 |
| 7,643,243 B2* | 1/2010 | Lee | G11B 25/043 |
| | | | 720/651 |
| 7,660,107 B2* | 2/2010 | Leung | G06F 1/187 |
| | | | 361/679.33 |
| 2008/0024972 A1* | 1/2008 | Yamaguchi | G11B 33/1493 |
| 2013/0155545 A1* | 6/2013 | Casey | G11B 33/08 |
| | | | 360/97.12 |

* cited by examiner

SYSTEM AND METHOD FOR REDUCING ACOUSTIC ENERGY NEAR HDD SYSTEMS

BACKGROUND

Field of the Disclosure

This disclosure relates generally to information handling systems and, more particularly, to systems for reducing acoustic energy near HDD systems.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system comprise many types of components for processing information, such as hard disc drives (HDDs) for storing information, as well as cooling systems to cool these components.

SUMMARY

Embodiments disclosed herein may be generally directed to protecting components in information handling systems and systems that prevent acoustic energy from negatively affecting components while still allowing cooling of the components.

A system for protecting a hard disc drive (HDD) from acoustic energy comprises foam strips positioned in gaps near the HDD to absorb acoustic energy, wherein the foam strips are oriented parallel with an airflow path. Each foam strip comprises an acoustically absorptive material having a thickness substantially equal to the gap such that the acoustically absorptive material is in a substantially uncompressed state. When two foam strips are positioned between an HDD and either another HDD or a wall, an airflow path is defined with an airflow path width configured to allow airflow to cool the HDD. Each foam strip comprises a foam strip width and foam strip length configured such that the acoustically absorptive material absorbs acoustic energy that would otherwise propagate through the airflow path and may alter acoustic modes within the gap.

In some embodiments, a system for protecting an HDD from acoustic energy may comprise foam strips directly adhered to the HDD. In some embodiments, a system for protecting an HDD from acoustic energy may comprise foam strips coupled to a frame that is coupled to the HDD. In some embodiments, a system for protecting an HDD from acoustic energy may comprise foam strips coupled to a frame that is coupled to an HDD carrier that is coupled to the HDD.

In some embodiments, a system for protecting an HDD from acoustic energy may comprise foam strips coupled to a tray installed between bays in a chassis.

Embodiments may include compliant areas for reducing vibration energy, wherein the compliant areas may be formed from the same or different material as the foam strips and have a thickness greater than a thickness of the foam strips.

BRIEF DESCRIPTION OF THE DRAWINGS

For a more complete understanding of the invention and its features and advantages, reference is now made to the following description, taken in conjunction with the accompanying drawings, in which.

DESCRIPTION OF PARTICULAR EMBODIMENT(S)

Figure 1:
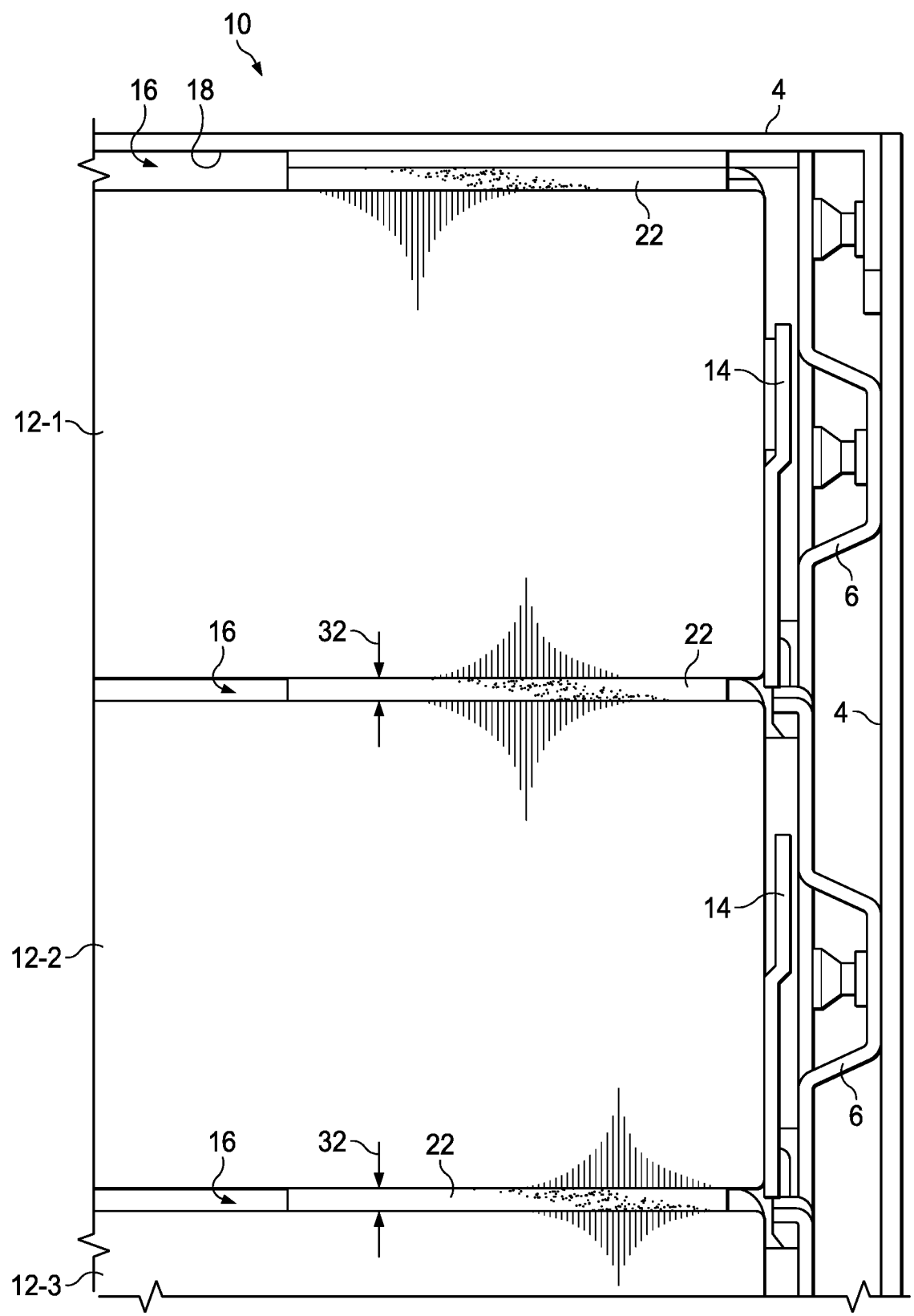
FIG. 1 is a close-up cutaway partial view of selected elements of an embodiment of an information handling system, illustrating a portion of system for protecting one or more hard disc drives (HDDs) from acoustic energy while still allowing cooling of the HDDs.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic device, a network storage device, or another suitable device and may vary in size, shape, performance, functionality, and price. The information handling system may include memory, one or more processing resources such as a central processing unit (CPU)

or hardware or software control logic. Additional components of the information handling system may include one or more storage devices, one or more communications ports for communicating with external devices as well as various input and output (I/O) devices, such as a keyboard, a mouse, and one or more video displays. The information handling system may also include one or more buses operable to transmit communication between the various hardware components.

Components of an information handling system may include, but are not limited to, a processor subsystem, which may comprise one or more processors, and a system bus that communicatively couples various system components to processor subsystem including, for example, a memory subsystem, an I/O subsystem, local storage resource, and network interface.

A processor subsystem may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, a processor subsystem may interpret and execute program instructions and process data stored locally (e.g., in a memory subsystem). In the same or alternative embodiments, a processor subsystem may interpret and execute program instructions and process data stored remotely (e.g., in a network storage resource).

A system bus may refer to a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

A memory subsystem may comprise a system, device, or apparatus operable to retain and retrieve program instructions and data for a period of time (e.g., computer-readable media). A memory subsystem may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system is powered down.

In an information handling system, an I/O subsystem may comprise a system, device, or apparatus generally operable to receive and transmit data to or from or within the information handling system. An I/O subsystem may represent, for example, a variety of communication interfaces, graphics interfaces, video interfaces, user input interfaces, and peripheral interfaces. In various embodiments, an I/O subsystem may be used to support various peripheral devices, such as a touch panel, a display adapter, a keyboard, a touch pad, or a camera, among other examples. In some implementations, an I/O subsystem may support so-called 'plug and play' connectivity to external devices, in which the external devices may be added or removed while an information handling system is operating.

A local storage resource may comprise computer-readable media (e.g., hard disk drive, floppy disk drive, CD-ROM, and other type of rotating storage media, flash memory, EEPROM, or another type of solid-state storage media) and may be generally operable to store instructions and data.

A network interface may be a suitable system, apparatus, or device operable to serve as an interface between an information handling system and a network (not shown). A network interface enables an information handling system to communicate over a network using a suitable transmission protocol or standard. In some embodiments, a network interface may be communicatively coupled via a network to a network storage resource (not shown). A network coupled to a network interface may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). A network coupled to a network interface may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. A network coupled to a network interface or various components associated therewith may be implemented using hardware, software, or any combination thereof.

Components operating in an information handling system may generate acoustic energy, whereby acoustic energy may affect certain components more than others and may be generated over a wide range of frequencies. For example, a fan in a chassis may operate at various fan speeds to generate airflow through the chassis, wherein generation of the airflow may also generate acoustic energy that may affect another component such as a hard disc drive (HDD).

Embodiments include a system for protecting a hard disc drive (HDD) in an information handling system by reducing disruptive energy such as acoustic energy. Embodiments may be directly coupled to an HDD, may be coupled to an HDD using a frame or a carrier, or may be coupled to a tray installed between bays in a chassis. Embodiments of a system for protecting a hard disc drive (HDD) in an information handling system may also reduce vibration energy.

Particular embodiments are best understood by reference to FIGS. 1-5 and 6A-6C, wherein like numbers are used to indicate like and corresponding parts.

As used herein, a hyphenated form of a reference numeral refers to a specific instance of an element and the un-hyphenated form of the reference numeral refers to the collective or generic element. Thus, for example, HDD "12" refers to an instance of a hard disc drive (HDD), which may be referred to collectively as HDDS "12" and any one of which may be referred to generically as HDD "12."

Turning to the drawings, FIG. 1 illustrates a close-up, cutaway partial side view of chassis 10 of an information handling system with three exemplary HDDs 12. Chassis 10 of an information handling system may comprise a plurality of walls 4 and structures such as rails 6 for installing components such as HDDs 12. Chassis 10 may contain a single HDD 12 or multiple HDDs 12. For example, as depicted in FIG. 1, chassis 10 may contain three HDDs 12-1, 12-2 and 12-3. Each HDD 12 may be contained in an HDD carrier 14 for ease of installation and removal relative to rails 6, wherein HDD carriers 14 ensure HDDs 12 are securely contained in chassis 10 and separated to allow airflow between adjacent HDDs 12 and between HDDs 12 and walls 4.

Still referring to FIG. 1, in some information handling systems, chassis 10 may be configured to contain multiple HDDs 12, wherein first HDD 12-1 may be positioned between inner surface 18 of chassis 10 and second HDD 12-2, second HDD 12-2 may be positioned between first HDD 12-1 and third HDD 12-3, and third HDD 12-3 may be positioned between a fourth HDD 12 (not shown) or some other component or wall 4 of chassis 10. For cooling purposes, first HDD 12-1 may be separated from inner surface 18 by a gap 16 and separated from second HDD 12-2 by a gap 16 and second HDD 12-2 may be separated from third HDD 12-3 by a gap 16. Each gap 16 depends on the dimensions of an HDD 12 (e.g., HDD 12-1) and the dimensions of an adjacent HDD 12 (e.g., HDD 12-2) or the distance to an inner surface 18 of wall 4.

A concern with information handling systems having an HDD 12 is acoustic energy. In general, acoustic energy in chassis 10 may be generated from any of multiple sources. For example, acoustic energy may be generated by a fan (not shown), especially at higher fan speeds. The acoustic energy may be generated over a range of frequencies, wherein certain type of frequencies or ranges of frequencies may negatively affect the operation of HDD 12. For example, acoustic energy, particularly high amplitude acoustic energy, may cause HDD 12 to vibrate and a read/write head may miss a track. This acoustic energy may propagate through gaps 16 between adjacent HDDs 12 or between an HDD 12 and an inner surface 18 of wall 4.

Foam Strips Aligned Parallel to Airflow

A system for protecting an HDD 12 from acoustic energy comprises foam strips 22 positioned in gaps 16, wherein each foam strip 22 comprises an acoustically absorptive material having a thickness 32 substantially equal to gap 16 such that, when foam strip 22 is positioned between HDD 12 and another HDD 12 or wall 4, the acoustically absorptive material is in a substantially uncompressed state. Furthermore, instead of positioning acoustically absorptive material perpendicular to an airflow path, a set of foam strips 22 partially define an airflow path, wherein airflow passes through the airflow path but the acoustically absorptive material on either side of the airflow path has a foam strip width and foam strip length configured to absorb acoustic energy that would otherwise propagate through the airflow path, discussed in greater detail below.

Figure 2:
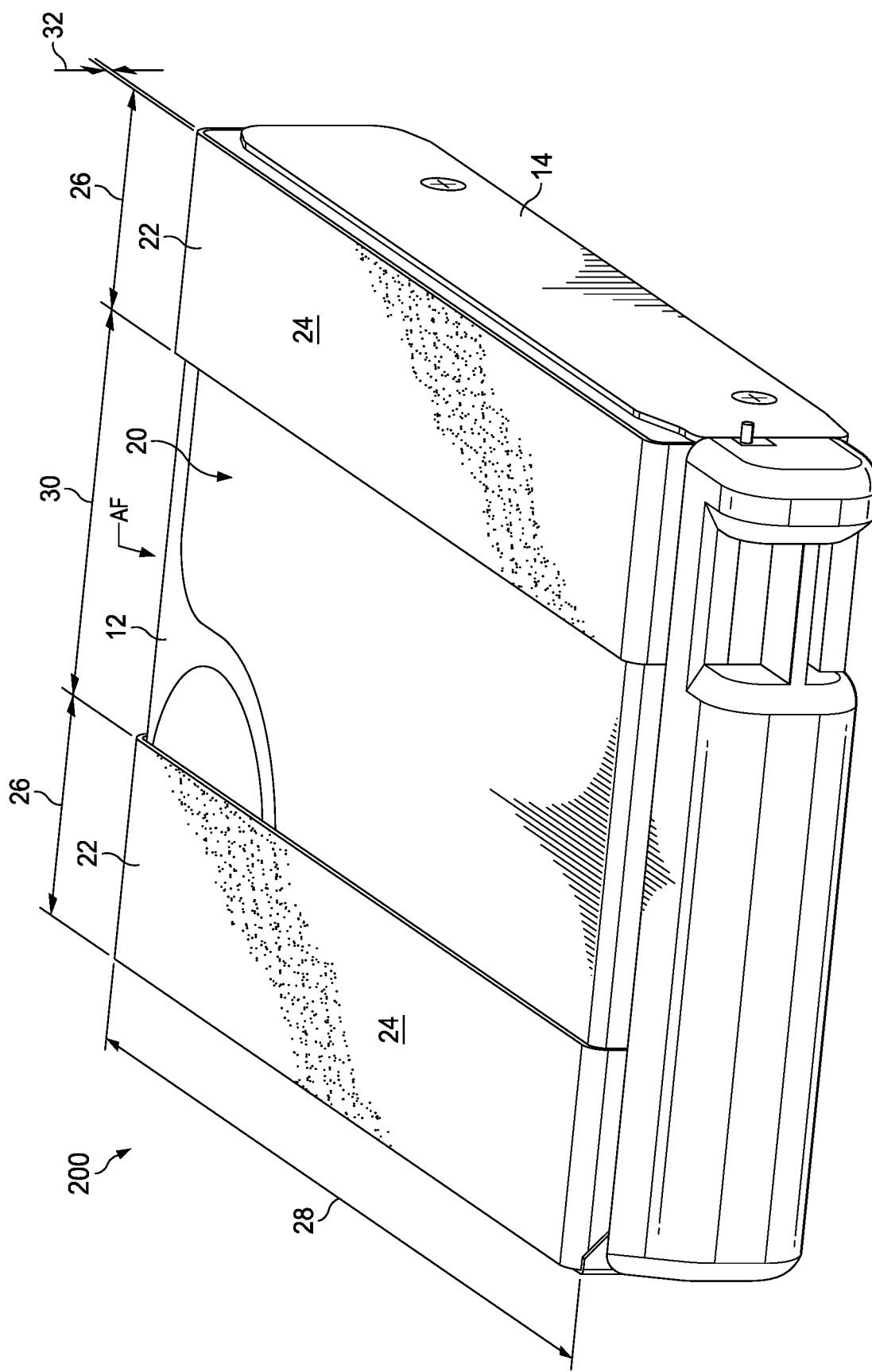
FIG. 2 is a perspective view of an exemplary HDD with one embodiment of a system for protecting the HDD from acoustic energy while still allowing cooling of the HDD.

Acoustically Absorptive Material is Maintained in a Substantially Uncompressed State in a Gap Referring to FIGS. 1 and 2, foam strips 22 are formed from acoustically absorptive material, wherein the amount of acoustic energy that acoustically absorptive material can absorb depends on the dimensions of foam strips 22 and if foam strips 22 are in an uncompressed state. For example, foam strips 22 having a foam strip thickness of 2 mm in an uncompressed state will absorb more acoustic energy than foam strips 22 having a foam strip thickness of 1 mm in an uncompressed state. However, if gap 16 is 1 mm, foam strips 22 having an initial foam strip thickness of 2 mm but in a compressed state (i.e., compressed to 1 mm in gap 16) may absorb less acoustic energy than foam strips 22 having a foam strip thickness of 1 mm in an uncompressed state in gap 16. It may be possible that acoustically absorptive material in a compressed state may actually reflect some acoustic energy, increasing the negative effects of acoustic energy. In some embodiments, acoustically absorptive material serves as a pressure release for acoustic energy, which may alter width-wise mode to reduce excitation or amplification of acoustic energy. In some embodiments, acoustically absorptive material may be configured to absorb acoustic energy at a certain frequency or in a range of frequencies. For example, acoustically absorptive material may be configured to absorb acoustic energy associated with a fan generating an airflow in the chassis, whereby absorbing acoustic energy emitted by the fan may enable the fan to operate at higher fan speeds without affecting operation of HDDs 12.

To maximize the amount of acoustic energy that each foam strip 22 is capable of absorbing near HDD 12, each foam strip 22 has foam strip thickness 32 substantially equal to the distance of gap 16 to ensure foam strip 22 (in a substantially uncompressed state) occupies substantially the entire gap 16 between adjacent HDDs 12 or between HDD 12 and inner surface 18 of wall 4. In some embodiments, each foam strip 22 comprises foam strip thickness 32 to ensure contact between foam strip 22 and an adjacent HDD 12 or inner surface 18 of wall 4.

With foam strip thickness 32 of each foam strip 22 configured for maximum acoustic energy absorption by the acoustically absorptive material, other dimensions of each foam strip 22 may be configured to determine how much acoustic energy can be absorbed in gap 16, which may include altering acoustic modes in gap 16. The foam strip width 26 may determine how much acoustic energy is absorbed, including what frequency or range of frequencies, and may also alter an acoustic mode. Foam strip width 26 is configured greater than the foam strip thickness 32 for increased absorption of acoustic energy but is limited by the dimensions of HDD 12 and the need for airflow in gap 16. For example, referring to FIG. 2, a set of foam strips 22 may be directly coupled to surface 20 of HDD 12, wherein each foam strip 22 has a foam strip width 26, foam strips 22 are separated by airflow path width 30, and the combined foam strip widths 26 and airflow path width 30 substantially equal a width of surface 20. Foam strips 22 with a larger foam strip width 26 may absorb more acoustic energy but must be spaced closer together, which results in a smaller airflow path width 30 for decreased airflow. Foam strips 22 with a smaller foam strip width 26 may be spaced farther apart to define a larger airflow path width 30 for increased airflow, but the reduction in acoustically absorptive material results in a higher chance that acoustic energy is not absorbed. The foam strip length 28 of each foam strip 22 may be configured such that the acoustically absorptive material can absorb more acoustic energy, including altering an acoustic mode. In some embodiments, each foam strip 22 has a foam strip length 28 substantially equal to a dimension of HDD 12. In some embodiments, each foam strip 22 has a foam strip length 28 approximately equal to a length of surface 20 of HDD 12 such that each foam strip 22 coupled to HDD 12 extends from a first edge of surface 20 to a second edge of surface 20. In some embodiments, each foam strip 22 has a foam strip length 28 that extends beyond a length of surface 20 of HDD 12. In some embodiments, each foam strip 22 extends beyond the first edge and/or second edge of surface 20 of HDD 12 such that foam strip 22 bends or curves for contact with at least one additional (end) surface of HDD 12, wherein the foam strip 22 contacts two or more surfaces of HDD 12. A foam strip 22 may have a ramped edge or a rounded end with a radius to facilitate installation of HDD 12 into chassis 10 without tearing the acoustically absorptive material. Each foam strip 22 may have a protective layer 24 such as mylar to facilitate installation of HDD 12 into chassis 10 without tearing the acoustically absorptive material.

Foam Strips may be Directly Coupled to a Hard Disc Drive

Referring to FIGS. 1 and 2, in some embodiments, a system 200 for protecting hard disc drive (HDD) 12 from acoustic energy comprises a set of foam strips 22 directly adhered to HDD 12 as a single unit. Each foam strip 22 may be adhered or otherwise coupled to HDD 12 before other steps in an installation process. In some embodiments, each foam strip 22 may be coupled to HDD 12 before carrier 14 is coupled to HDD 12. Each foam strip 22 may comprise a protective layer 24 to protect acoustically absorptive material from tearing during installation and removal. In some embodiments, each foam strip 24 comprises mylar as a protective layer 24. Each foam strip 22 has a width 26, a length 28 and a thickness 32 configured to provide increased absorption of acoustic energy. Foam strips 22 may be separated by an airflow path width 30 as part of an airflow path for airflow (AF). For example, an airflow path may be defined between two foam strips 22, a first surface of an HDD (e.g., HDD 12-2) and a second surface comprising a surface of an adjacent HDD 12 (e.g., HDD 12-1) or inner surface 18 of chassis 10. Airflow (AF) may flow parallel to length 28 to cool surface 20 of HDD 12, wherein acoustic energy propagating through the airflow path may be absorbed by acoustically absorptive material in foam strips 22 on either side of airflow path.

Compliant Areas may Reduce Vibration Energy

Figure 3:
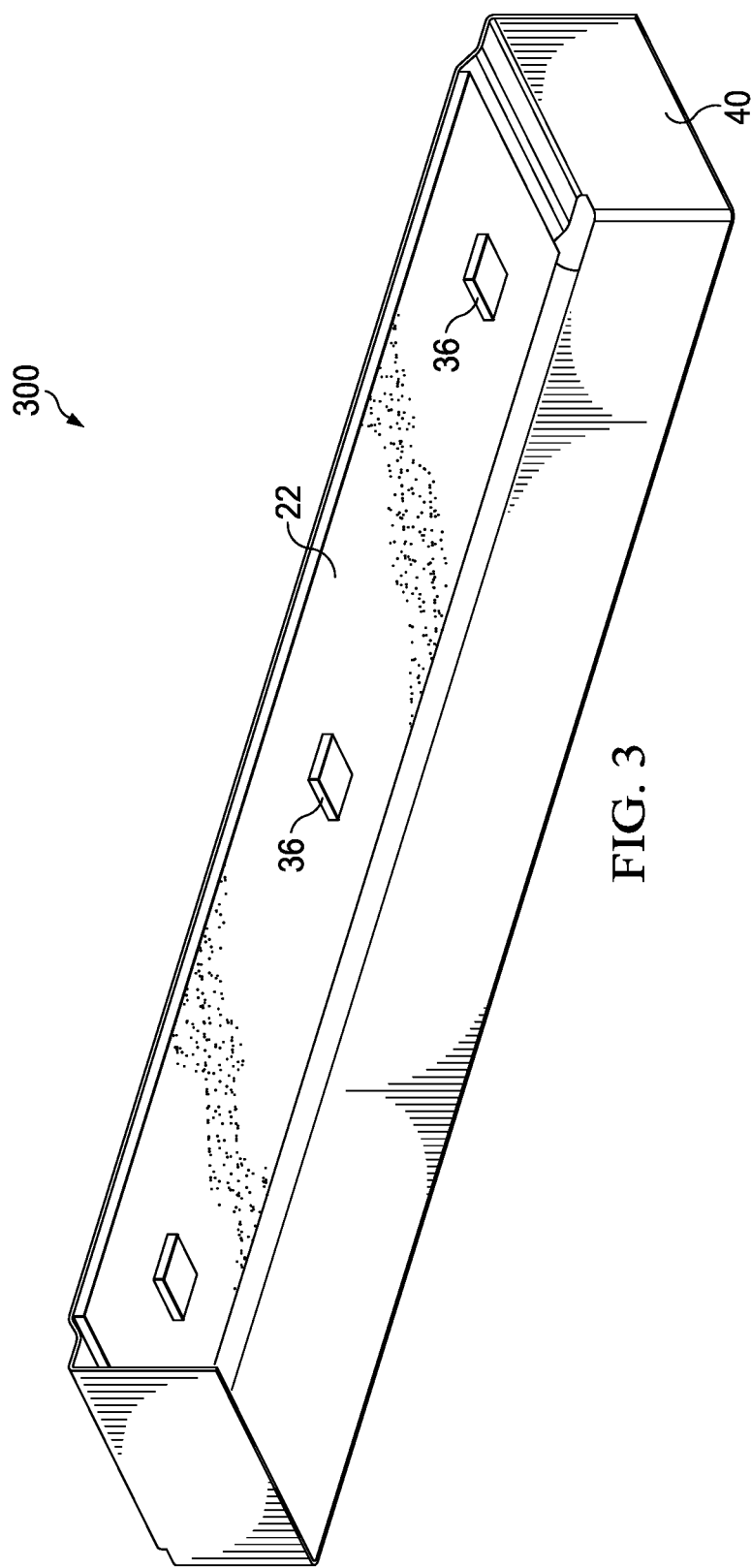
FIG. 3 is perspective view of one embodiment of a system for protecting an HDD from acoustic energy while still allowing cooling of the HDD.
Figure 4:
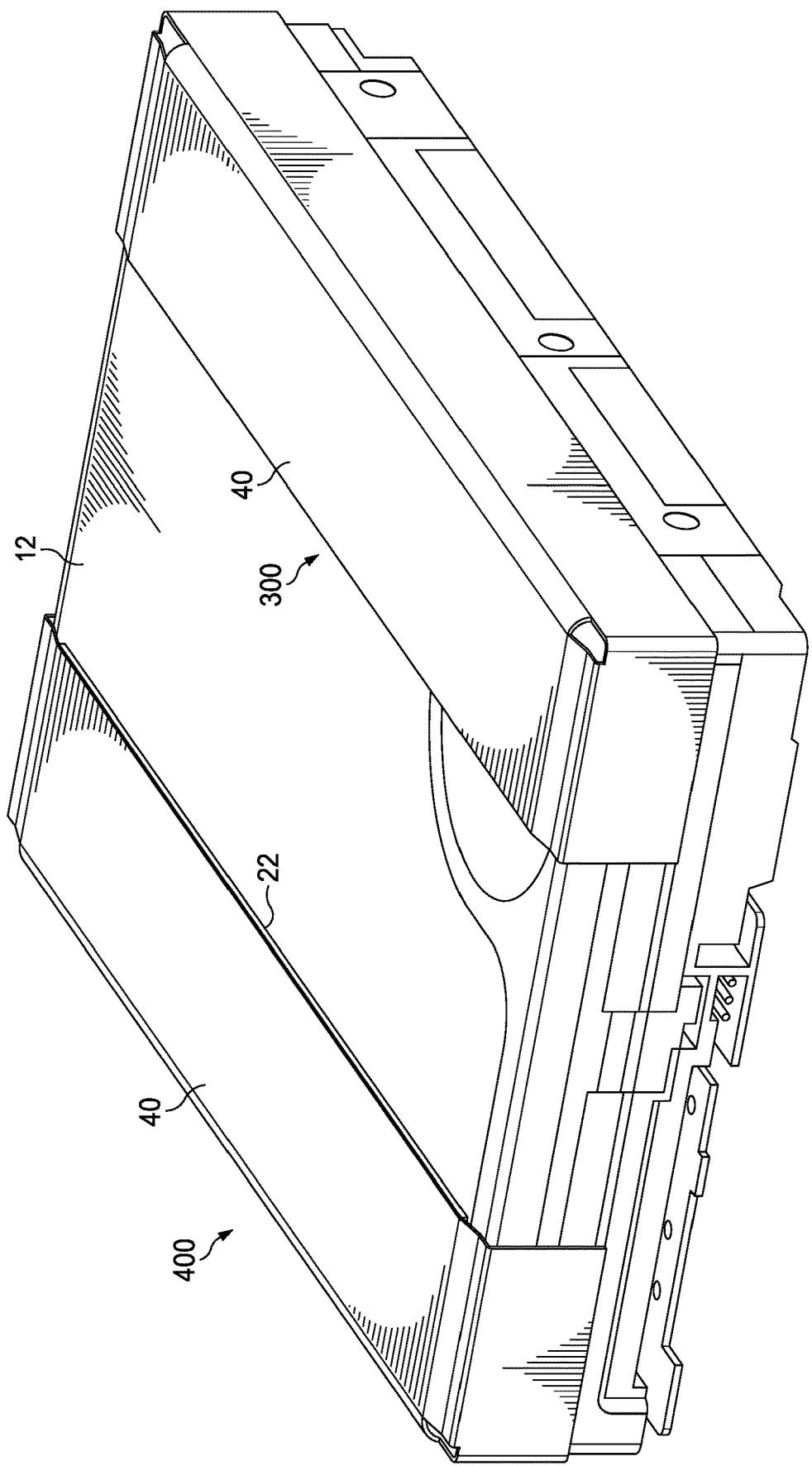
FIG. 4 is perspective view of one embodiment of a system installed on a hard disc drive (HDD) for protecting the HDD from acoustic energy while still allowing cooling of the HDD.

Referring to FIGS. 1-3, some embodiments may be configured to reduce vibration energy as well as acoustic energy. To address vibration energy, in some embodiment, foam strips 22 may comprise areas 36 of compliant material. Compliant areas 36 may be formed from the same acoustically absorptive material as foam strips 22 or may be formed from a different material selected for increased damping of vibration energy. Foam strips 22 may have a foam strip thickness 32 substantially equal to gap 16 for absorbing acoustic energy and compliant areas 36 may have a compliant area thickness greater than gap 16 to ensure some damping of vibration energy associated with HDD 12. For information handling systems with multiple HDDs 12, a system with foam strips 22 having compliant areas 36 may result in mass damping of the HDDs.

Foam Strips may be Coupled to a Frame

Referring to FIGS. 1-4, in some embodiments, a system for protecting hard disc drive (HDD) 12 from acoustic energy may comprise frame 400 in which a set of foam strips 22 are coupled to frame 40 as a single unit. Each foam strip 22 may be adhered to frame 40, which may protect acoustically absorptive material from tearing during installation and removal. Each foam strip 22 may be coupled to frame 40 before other steps in an installation process. In some embodiments, each foam strip 22 may be coupled to frame 40 before frame 40 is coupled to HDD 12 or carrier 14.

Foam Strips may be Coupled to a Carrier

Figure 5:
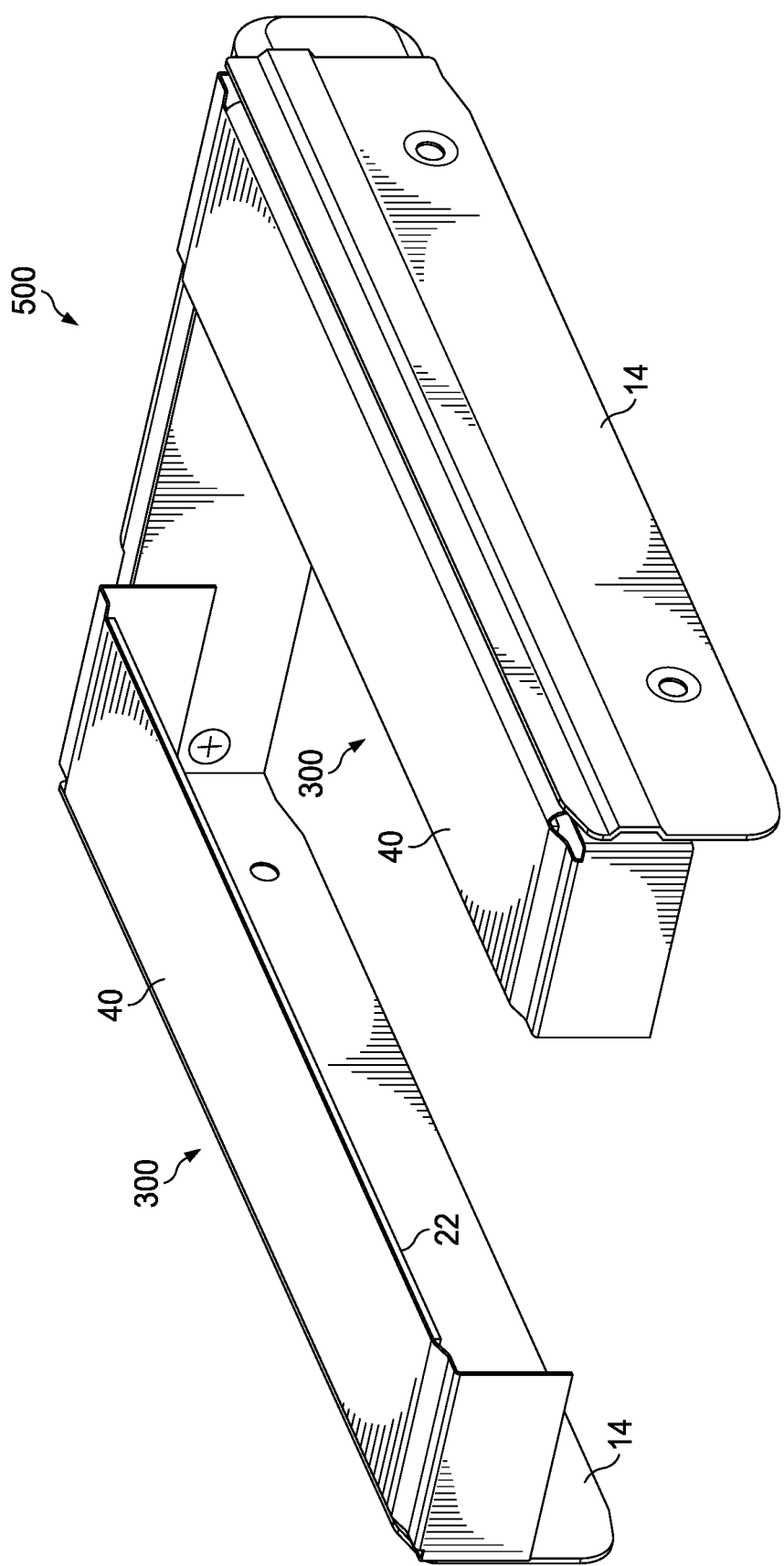
FIG. 5 is perspective view of an alternate embodiment of a system for protecting an HDD from acoustic energy while still allowing cooling of the HDD.

Referring to FIGS. 1-5, in some embodiments, a system 500 for protecting hard disc drive (HDD) 12 from acoustic energy comprises carrier 14 coupled to frames 40 and a set of foam strips 22 adhered to frames 40 as a single unit. FIG. 5 depicts one embodiment in which a set of foam strips 22 is coupled to frames 40, wherein frames 40 protect acoustically absorptive material from tearing during installation and removal. Each foam strip 22 may be coupled to frame 40 and frame 40 may be coupled to carrier 14 before other steps in an installation process. In some embodiments, each foam strip 22 may be coupled to frame 40 and frame 40 may be coupled to carrier 14 before carrier 14 is coupled to HDD 12.

Foam Strips may be Coupled to a Tray Assembly

Referring to FIGS. 1 and 6A-6C, in some embodiments, a system for protecting hard disc drive (HDD) 12 from acoustic energy comprises tray 600 in which a set of foam strips 22 are adhered to tray 600.

Figure 6A:
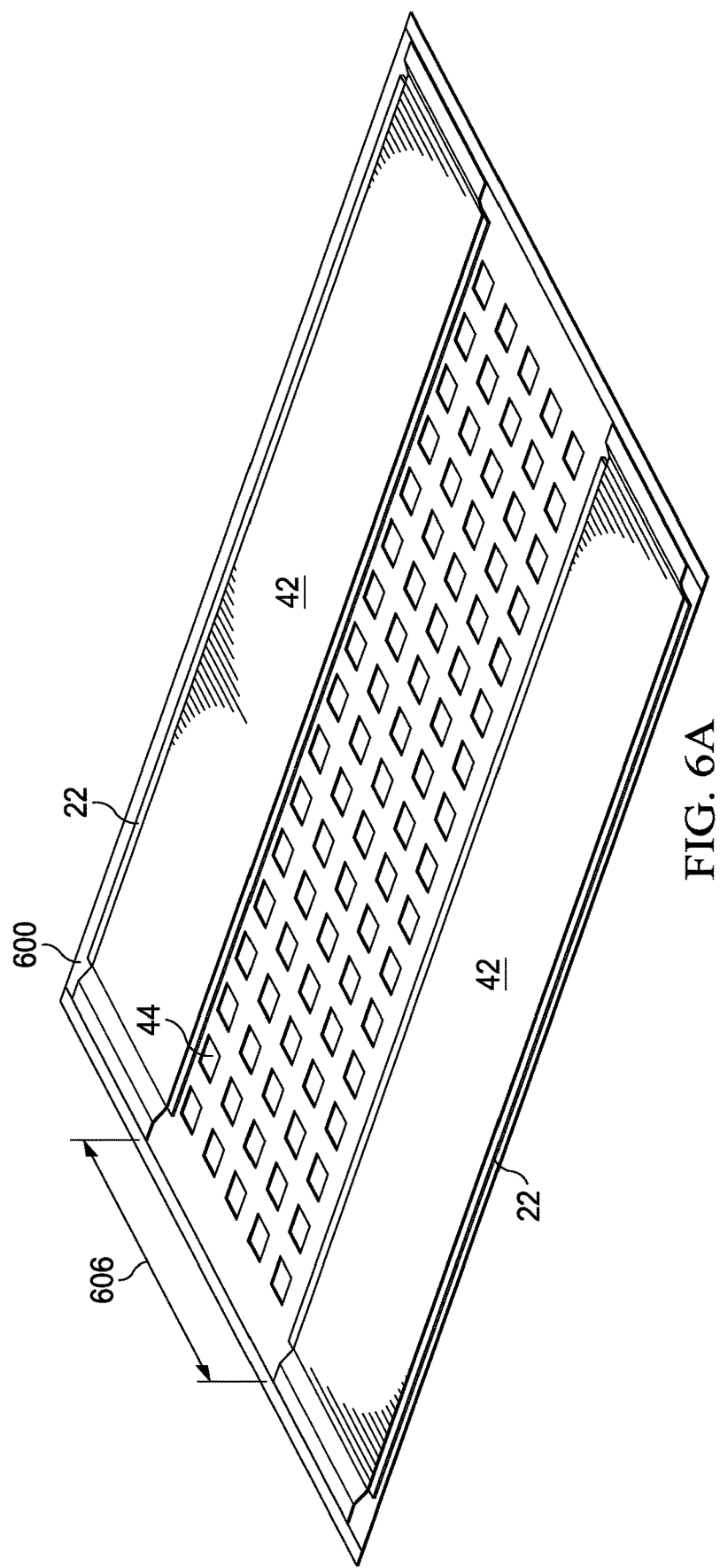
FIG. 6A is a perspective view of an alternate embodiment of a system for protecting a HDD from acoustic energy while still allowing cooling of the HDD.

FIG. 6A depicts one embodiment in which a set of foam strips 22 is directly adhered to tray 600. Each foam strip 22 may comprise a protective layer 42 to protect acoustically absorptive material from tearing during installation and removal. Each foam strip 22 may be adhered or otherwise coupled to tray 600 before other steps in an installation process. In some embodiments, each foam strip 22 may be coupled to tray 600 before HDD 12 is positioned in tray 600. Tray 600 may comprise center portion 606 comprising a plurality of vents 44 to allow airflow to HDD 12 mounted on tray 600. Center portion 606 may be substantially equal to a width of an airflow path. Tray 600 may be configured with a thickness less than gap 16 to reduce resistance of airflow through an airflow path defined between foam strips 22, a first HDD 12 installed in first bay 604-1 and a second HDD installed in second bay 604-2.

Figure 6B:
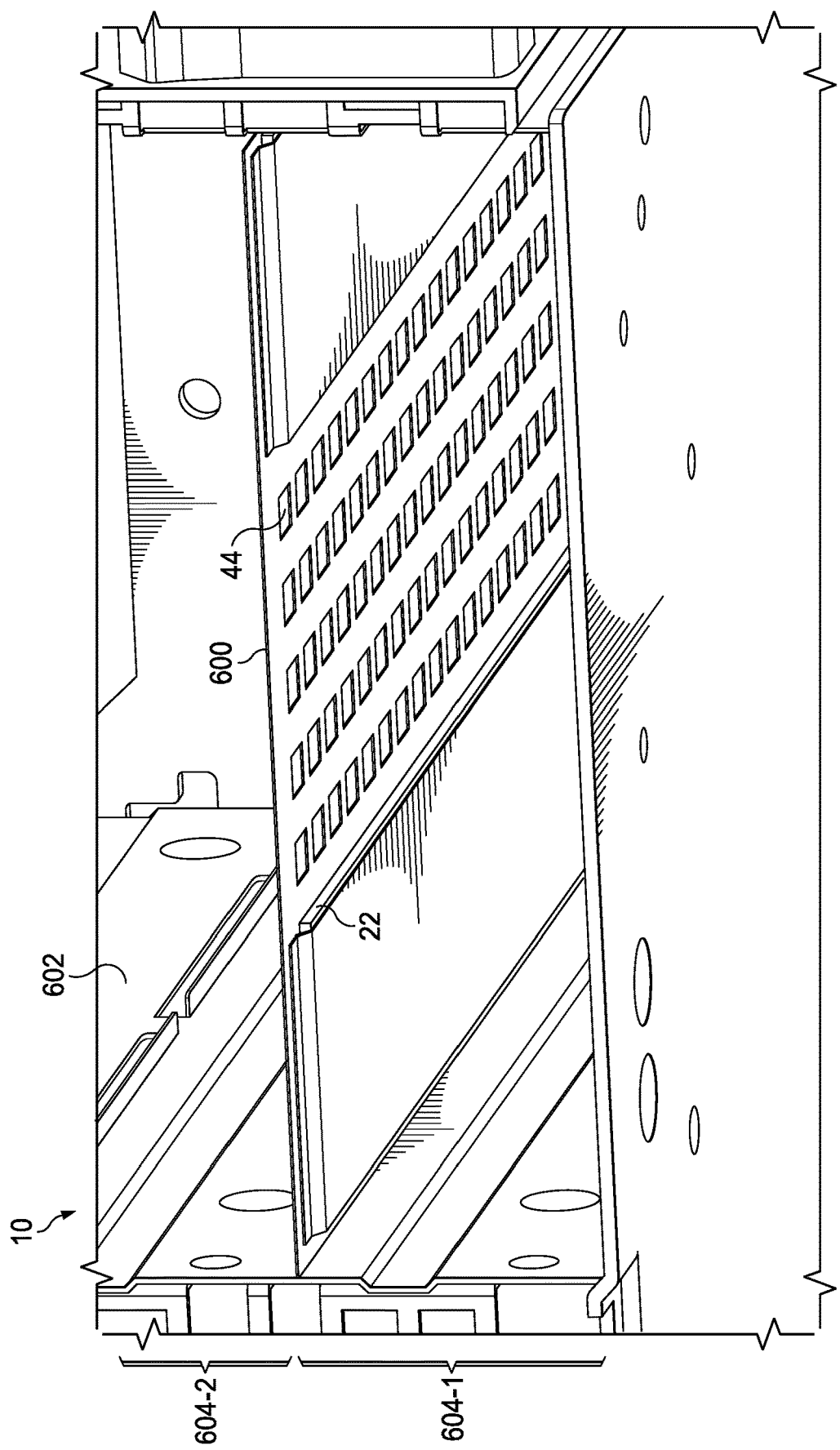
FIGS. 6B and 6C are partial perspective views of the alternative embodiment depicted in FIG. 6A installed in a bay of a chassis of an information handling system.
Figure 6C:
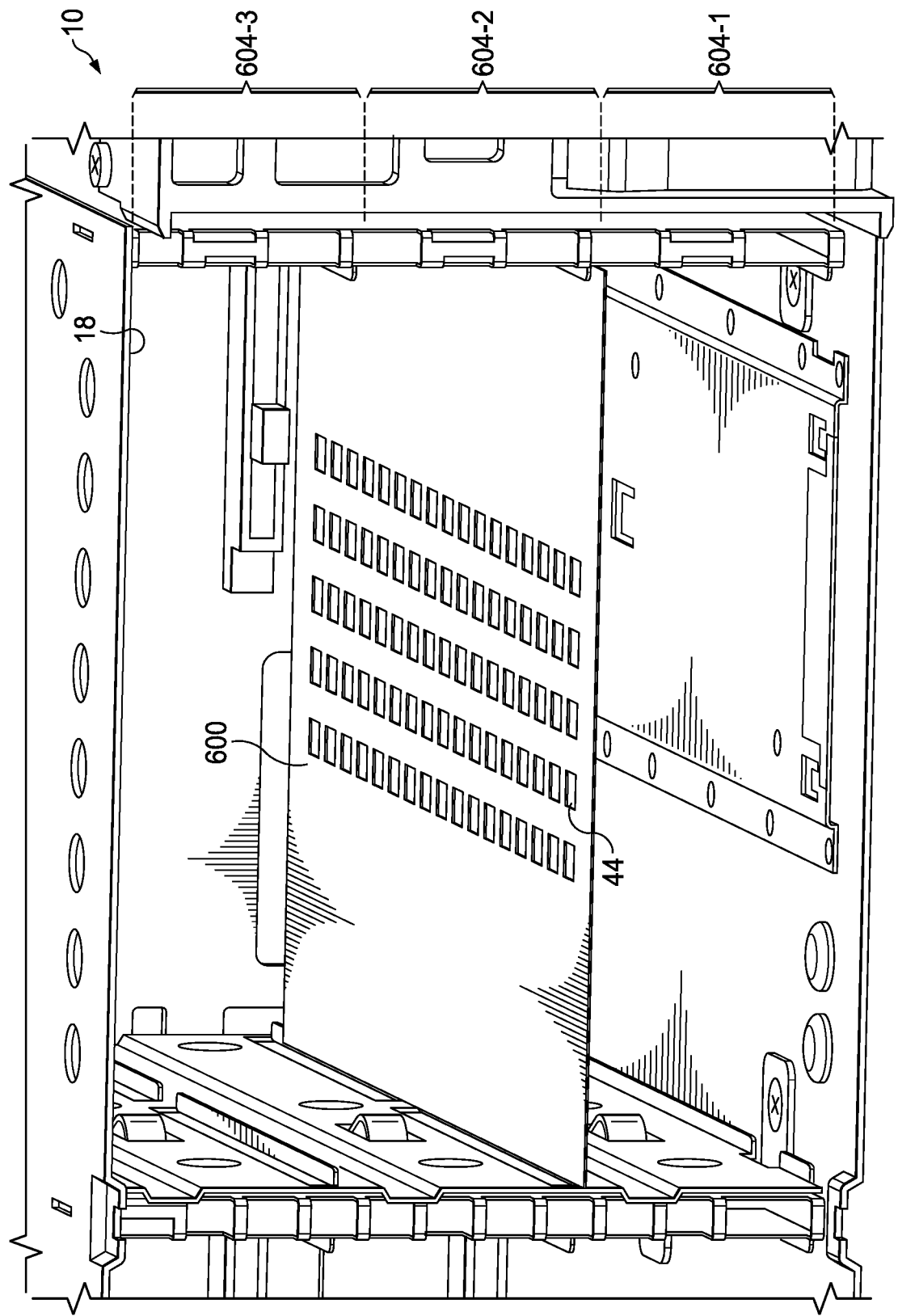

Referring to FIGS. 6B and 6C, embodiments of chassis 10 may comprise rails 602 for supporting tray 600. Multiple HDDs 12 may be installed in multiple bays 604, wherein a first HDD 12 (not shown in FIGS. 6A-6C) may be positioned in first bay 604-1 and a second HDD 12 may be positioned in second bay 604-2, wherein tray 600 separates first bay 604-1 from second bay 604-2. Tray 600 positioned in rails 602 may support second HDD 12 in second bay 604-2 and foam strips 22 may ensure acoustic energy in chassis 10 does not affect either HDD 12. A second tray 600 (not shown) may separate second bay 604-2 from a third bay 604-3.

Combinations of embodiments disclosed above may be possible. For example, HDDs 12 from different vendors and/or having different performance parameters may be installed in the same chassis 10, wherein a first HDD 12 might not have any foam strips 22 and be installed in first bay 604-1 and tray 600 may be installed to provide acoustic energy protection of the first HDD 12, a second HDD may already be coupled to carrier 14 and be installed in second bay 604-2, and a third HDD 12 may be coupled to system 400 and be installed in third bay 604-3.

Advantageously, embodiments may protect components such as HDDs 12 from negative effects of acoustic energy. Furthermore, each system may be configured for a particular HDD 12 or type of acoustic energy. For example, referring to FIG. 5, system 500 may be configured such that, when an HDD 12 or a particular type, model, etc., is coupled to frames 40, the set of foam strips 22 already have a thickness 32, a width 26, a length 28 and are separated by an airflow path width 30 to ensure cooling of HDD by airflow AF and also absorb acoustic energy (or a type of acoustic energy) at a frequency or a range of frequencies that might otherwise propagate through the airflow path.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A system for reducing acoustic energy near a hard disc drive (HDD) installed in a bay in a chassis of an information handling system, wherein the HDD is positioned in the bay with a gap between a first surface of the HDD and a surface of an adjacent HDD, the system comprising:
    a set of foam strips coupled to the first surface of the HDD, wherein:
        each foam strip in the set of foam strips comprises an acoustically absorptive material configured for absorbing acoustic energy when in an uncompressed state;
        each foam strip in the set of foam strips has a foam strip thickness equal to the gap, wherein each foam strip in the set of foam strips is in an uncompressed state when the HDD is installed in the bay;
        each foam strip in the set of foam strips comprises a foam strip length extending from a first edge of the first surface of the HDD to a second edge of the first surface of the HDD;
        a first foam strip of the set of foam strips, a second foam strip of the set of foam strips, the first surface of the HDD and the second surface define an airflow path, wherein the first foam strip is separated from the second foam strip by an airflow path width configured to enable airflow in the gap to cool the HDD;
        each of the first foam strip and the second foam strip comprise a foam strip width greater than the foam strip thickness such that the acoustically absorptive material absorbs acoustic energy propagating through the airflow path based on the foam strip width and foam strip length; and
    a vibration energy damping material coupled to each of the foam strips at one or more areas, the vibration energy damping material differing from the acoustically absorptive material of the foam strips, the thickness of the areas of the foam strips that have the vibration energy damping material coupled thereto is greater than the gap between the first surface of the HDD and the surface of the adjacent HDD.

2. The system of claim 1, wherein the set of foam strips are directly adhered to the HDD.

3. The system of claim 1, wherein each foam strip in the set of foam strips comprises a protective layer.

4. The system of claim 3, wherein the protective layer comprises mylar.

5. The system of claim 1, wherein each foam strip in the set of foam strips comprises a foam strip length greater than a length of the first surface of the HDD, wherein each foam strip in the set of foam strips forms a rounded edge.

6. The system of claim 1, further comprising a frame coupled to the HDD, wherein each foam strip in the set of foam strips is coupled to the frame.

7. The system of claim 6, wherein the frame is coupled to a HDD carrier.

8. A chassis for an information handling system, the chassis comprising:
    a hard disc drive (HDD);
    a bay for installing the HDD, wherein the HDD is positioned in the bay with a gap between a first surface of the HDD and a second surface comprising one of an inner surface of a wall of the chassis or a surface of an adjacent HDD; and
    a set of foam strips coupled to the first surface of the HDD, wherein:
        each foam strip in the set of foam strips comprises an acoustically absorptive material configured for absorbing acoustic energy when in an uncompressed state;
        each foam strip in the set of foam strips has a foam strip thickness equal to the gap, wherein each foam strip in the set of foam strips is in an uncompressed state when the HDD is installed in the bay;
        each foam strip in the set of foam strips comprises a foam strip length extending from a first edge of the first surface of the HDD to a second edge of the first surface of the HDD;
        a first foam strip of the set of foam strips, a second foam strip of the set of foam strips, the first surface of the HDD and the second surface define an airflow path, wherein the first foam strip is separated from the second foam strip by an airflow path width configured to enable airflow in the gap to cool the HDD; and
        each of the first foam strip and the second foam strip comprise a foam strip width greater than the foam strip thickness such that the acoustically absorptive material absorbs acoustic energy propagating through the airflow path based on the foam strip width and foam strip length; and
    a vibration energy damping material coupled to each of the foam strips at one or more areas, the vibration energy damping material differing from the acoustically absorptive material of the foam strips, the thickness of the areas of the foam strips that have the vibration energy damping material coupled thereto is greater than the gap between the first surface of the HDD and the surface of the adjacent HDD.

9. The chassis of claim 8, wherein:
    operation of a component in the information handling system generates acoustic energy at a component frequency; and
    the acoustically absorptive material is configured for acoustic energy absorption at the component frequency.

10. The chassis of claim 8, further comprising a tray configured for slidable insertion in the bay, wherein each foam strip in the set of foam strips is coupled to the tray.

11. The chassis of claim 10, wherein a center portion of the tray comprises vents.

12. The chassis of claim 8, wherein the set of foam strips are directly adhered to the HDD.

13. The chassis of claim 8, wherein each foam strip in the set of foam strips comprises a protective layer.

14. The chassis of claim 13, wherein the protective layer comprises mylar.

15. The chassis of claim 8, wherein each foam strip in the set of foam strips comprises a foam strip length greater than a length of the first surface of the HDD, wherein each foam strip in the set of foam strips forms a rounded edge.

16. The chassis of claim 8, further comprising a frame coupled to the HDD, wherein each foam strip in the set of foam strips is coupled to the frame.

17. The chassis of claim 16, wherein the frame is coupled to a HDD carrier.

* * * * *